(12) United States Patent
Fukuda et al.

(10) Patent No.: US 7,707,211 B2
(45) Date of Patent: Apr. 27, 2010

(54) INFORMATION MANAGEMENT SYSTEM AND METHOD

(75) Inventors: Munetatsu Fukuda, Kawasaki (JP); Koshichiro Mitsukuni, Yokohama (JP); Naoki Takahashi, Niigata (JP); Kazuki Kojima, Machida (JP); Shinichi Kirikoshi, Yokohama (JP); Eisuke Nishitsu, Kawasaki (JP); Minoru Oshino, Tokyo (JP); Akira Nishimura, Oyama (JP)

(73) Assignees: Hitachi, Ltd., Tokyo (JP); Hitachi Chemical Co., Ltd., Tokyo (JP)

( * ) Notice: Subject to any disclaimer, the term of this patent is extended or adjusted under 35 U.S.C. 154(b) by 432 days.

(21) Appl. No.: 11/558,026

(22) Filed: Nov. 9, 2006

(65) Prior Publication Data

US 2007/0156746 A1    Jul. 5, 2007

(30) Foreign Application Priority Data

Nov. 10, 2005    (JP) ............................ 2005-325552

(51) Int. Cl.
*G06F 17/30* (2006.01)
*G06F 7/00* (2006.01)

(52) U.S. Cl. ...................... 707/736; 707/770
(58) Field of Classification Search ............... 707/104.1
See application file for complete search history.

(56) References Cited

U.S. PATENT DOCUMENTS

| 2002/0059404 A1* | 5/2002 | Schaaf et al. ............... 709/220 |
| 2002/0198806 A1* | 12/2002 | Blagg et al. .................. 705/35 |
| 2003/0217027 A1* | 11/2003 | Farber et al. .................. 707/1 |
| 2005/0114862 A1* | 5/2005 | Bisdikian et al. ............ 718/105 |
| 2006/0005036 A1* | 1/2006 | Hu et al. ..................... 713/182 |

FOREIGN PATENT DOCUMENTS

| CN | 1521989 | 8/2004 |
| JP | 2003-150644 | 5/2003 |

* cited by examiner

*Primary Examiner*—Kuen S Lu
(74) *Attorney, Agent, or Firm*—Brundidge & Stanger, P.C.

(57) ABSTRACT

To obtain information having a relation, it is required for an application program to execute retrieval processing in which the program first acquires key information supervising relations between tables to sequentially trace the relations to finally obtain the target information. Since it is required for the program to execute as many access operations as there are hierarchic level of relations, the access efficiency is lowered. By establishing a correspondence between first relating information representing relations between a first table and a second table and second relating information, path information representing hierarchic structure of data between a plurality of tables is stored in a storage. Various processings are executed by use of the path information.

8 Claims, 15 Drawing Sheets

FIG.7

DEFINITION

| RELATING PIN TABLE 1 (FACTORY CODE - PRODUCT GROUP) ||
|---|---|
| FACTORY CODE (PARENT) | PRODUCT GROUP (CHILD) |

INFORMATION

| | |
|---|---|
| A | XX |
| A | YY |
| B | ZZ |
| C | WW |

| RELATING PIN TABLE 2 (COST DIVISION CODE - PRODUCT GROUP) ||
|---|---|
| COST DIVISION CODE (PARENT) | PRODUCT GROUP (CHILD) |
| aaa | XX |
| bbb | YY |
| ccc | ZZ |
| ddd | WW |

| RELATING PIN TABLE 3 (PRODUCT GROUP - PRODUCT MODEL NAME) ||
|---|---|
| PRODUCT GROUP (PARENT) | PRODUCT MODEL NAME (CHILD) |
| XX | 133 |
| YY | 234 |
| YY | 567 |
| ZZ | 890 |

| RELATING PIN TABLE 4 (PRODUCT GROUP - SALES MODEL NAME) ||
|---|---|
| PRODUCT GROUP (PARENT) | SALES MODEL NAME (CHILD) |
| XX | A133 |
| YY | B234 |
| YY | C567 |
| ZZ | D890 |

| RELATING PIN TABLE 5 (PRODUCT MODEL NAME - SALES MODEL NAME) ||
|---|---|
| PRODUCT MODEL NAME (PARENT) | SALES MODEL NAME (CHILD) |
| 133 | A133 |
| 234 | B234 |
| 567 | C567 |
| 890 | D890 |

| RELATING PIN TABLE 6 (SALES MODEL NAME - SALES MODEL NAME) ||
|---|---|
| SALES MODEL NAME (PARENT) | PRODUCT MODEL NAME (CHILD) |
| A133 | 133 |
| B234 | 234 |
| C567 | 567 |
| D890 | 890 |

AFTER DELETION

FIG.14

| PERIOD : 2005/4/1 ~ 2005/10/1 | |
|---|---|
| RELATING PIN TABLE 1 (FACTORY CODE - PRODUCT GROUP) | |
| | PRODUCT GROUP (CHILD) |
| | XX |
| | YY |
| | YY |
| | ZZ |

| PERIOD : 2004/10/1 ~ 2005/3/31 | |
|---|---|
| RELATING PIN TABLE 1 (FACTORY CODE - PRODUCT GROUP) | |
| | PRODUCT GROUP (CHILD) |
| | XX |
| | YY |
| | YY |
| | WW |

| PERIOD : 2004/4/1 ~ 2004/9/30 | |
|---|---|
| RELATING PIN TABLE 1 (FACTORY CODE - PRODUCT GROUP) | |
| FACTORY CODE (PARENT) | PRODUCT GROUP (CHILD) |
| A | XX |
| A | YY |
| B | ZZ |
| C | WW |

INFORMATION MANAGEMENT SYSTEM AND METHOD

INCORPORATION BY REFERENCE

The present application claims priority from Japanese application JP2005-325552 filed on Nov. 10, 2005, the content of which is hereby incorporated by reference into this application.

BACKGROUND OF THE INVENTION

The present invention relates to a method of assigning relations between information items of mutually different tables, and in particular, to a method of, when information items are in a relation in which the information items are related to each other, generating the information items and definitions of the relation therebetween and a retrieval processing method and a retrieval processing apparatus for retrieving the information items thus related. In particular, the present invention relates to information processing in which hierarchic structure to total data to measure business results of an enterprise or a firm or relating information to obtain knowledge information in the knowledge management is not held in a master, but is stored in an external table as information relating masters to each other.

To develop, for example, application programs in an object-oriented scheme, required information items and relations therebetween are analyzed to define an information model using, for example, a diagram representatively associated with a Unified Modeling Language (UML). Using the information model, programs and databases (DB) are designed. Particularly, in the database designing phase, in the case Table A is to be related to Table B, one must determine a key to be defined in common with Table B, and must define the key in Table A. Therefore, the definitions of relations between information items are required to be manually redesigned according to the information model.

FIG. 2 shows an example of a database designing process using UML in which an information model obtained as a result of the information analysis is developed into constituent components of database (DB) structure. According to UML, a term "class" is employed to indicate "factory", "cost division", "product group", "product", "sales" or the like. A system analyzer defines class names for the respective classes and defines information items of various attributes for each class. The analyzer also represents relations between the classes using, for example, relation type lines to thereby define multiplicity of relations between the classes. Thanks to classes, the information items are classified into groups.

For a class, like a product group of FIG. 2, having relations with other classes in the upper and lower positions, when it is desired to retrieve the class through the relations during a retrieval, it is required to dispose the information of the relations between the classes in one and the same table in the database. Therefore, the database tables are required to be designed in consideration of the operation during the retrieval phase. For example, a factory master and a product group master include a shared attribute "factory code" in example of the configuration shown in FIG. 2.

There also exists a disadvantage viewed from application programs as below. For an application program to obtain target information, the relations defined in the respective tables are required to be known in advance. If a change takes place in the relations between the information items, it is required to examine the relations between the tables to again conduct the database designing phase.

To remove the problem, JP-A-2003-150644 describes a technique, i.e., a relating information management system in which various information items are managed by establishing relations therebetween. The system at least includes a relation management table to store relations between a parent and a child using identifier information of various information and a retrieval processing module to execute retrieval processing to retrieve various information in a direction from the parent to the child and in a direction from the child to the parent by use of the relations in the relation management table, according to specified information and a specified range. The identifier information includes an identifier (ID), File Allocation Table (FAT) information, an in-FAT record address, a file type, a directory path, a file name, a selection range, an object, an attribute, or information including an attribute. The various information items are managed using a member management table in which member data including the identifier information and detailed information is stored.

SUMMARY OF THE INVENTION

However, the conventional technique is accompanied by problems to be solved. It is therefore an object of the present invention to solve part of the problems, which are exemplified as below.

For an application program to attain information, key information indicating the relations between the tables are beforehand known and then the retrieval is conducted through the relations in a sequential way to finally attain the target information. Therefore, it is required to conduct as many access operations as there are hierarchic levels of relations, which hence lowers access efficiency. In the conventional technique, consideration has not been given to this disadvantageous point.

When a structure change occurs in the relations of information for example, information of an organization, a change also occurs in the relations information in the database. It is therefore not possible that various totals and relations of information in the future beforehand defined on the basis of relations in the past are used for simulation. Additionally, it is not possible that the totals and the relations are beforehand registered for an information modifying operation. Moreover, if the relations between information are changed, the retrieval interface of the application program is also changed depending on cases. The disadvantage has not been taken into consideration in the technique of the prior art.

According to the conventional technique, the information model of, for example, UML cannot be directly employed for the database designing phase. The table coupling operation and the access operation therefor are conducted as many times as there are hierarchic levels of relations. When a change occurs in the relations, the database designing is to be modified. The application program cannot use the information management system on the basis of the relations in the past and those in the future. If a structure change takes place in the relations of information, it is required to vary a retrieval interface of the application program depending on cases. That is, the prior art is accompanied by the problems.

It is therefore an object of the present invention to provide an information management system having higher usability to thereby remove the problems of the prior art.

In a storage, there is stored path information representing hierarchic structure of data between a plurality of tables by establishing a correspondence between first relating information representing a relation of a first table with a second table and second relating information similarly representing a relation between tables. According to the path information, various processings are executed.

According to the present invention, there is provided an information management method using a table indicating relations between tables, which makes it possible to carry out information management with higher usability.

Other objects, features and advantages of the invention will become apparent from the following description of the embodiments of the invention taken in conjunction with the accompanying drawings.

BRIEF DESCRIPTION OF THE DRAWINGS

FIG. 7 is a diagram showing an example of relating pin table definitions automatically generated using the information model and entities of the information.

FIG. 14 is a diagram showing an example of specifications of relating pin table valid period according to an embodiment of the present invention.

DESCRIPTION OF THE EMBODIMENTS

Next, referring to the accompanying drawings, description will be given in detail of embodiments according to the present invention. However, the present invention is not restricted by the embodiments.

<System Configuration>

Figure 1:
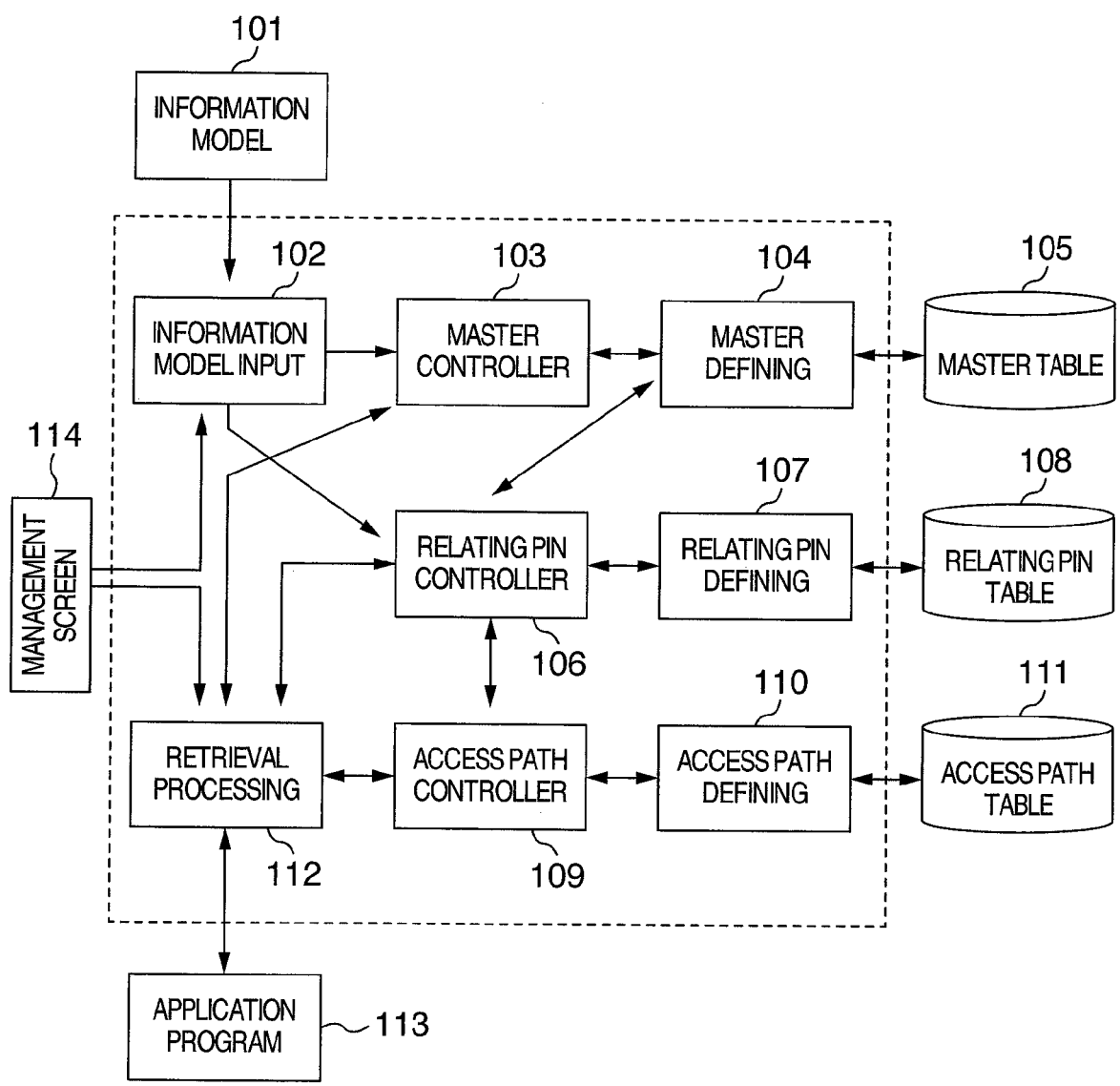
FIG. 1 is a block diagram showing a configuration of an embodiment of the information management system according to the present invention.

FIG. 1 shows an example of a configuration of a system according to the present invention. In the configuration, 101 indicates an information model in which relations between information such as those of UML are represented using a diagram, 114 is a screen for the manager or the like to maintain relations between information, 102 is an input device to input items for the model 101 and on the screen 114, 103 is a master controller to conduct control operation in which the item thus inputted is interpreted to be converted into a definition of a master record of a database and in which an access request to a master is controlled, 104 is a master defining unit to manage the contents of definitions converted by the master controller 103, 105 indicates entities of master tables, 106 is a relating pin controller which interprets relations between information to create relating pin tables and which processes a relation access request, 107 is a relating pin defining unit to manage the relating pins, 108 indicates entities of the relating pin tables, 109 is an access path controller which interprets and creates a path to access a relating pin table and which controls a retrieval request using the path, 110 is an access path defining unit to manage access paths, 111 indicates entities of the access path tables, 112 is a retrieval processing unit which receives a retrieval request to interpret the contents thereof to execute retrieval processing, and 113 is an application program to conduct operations by use of the constituent components described above. In this regard, when a structural relations such as a one-to-many correspondence, a many-to-one correspondence, or a one-to-one correspondence exists (i.e., "a relation exists" in terms of UML) between a first class and other classes, the term "relation" indicates a relation between attributes as keys of relations between classes. Or, when the classes are implemented in the form of tables, the term "relation" indicates a relation between data items as keys of relations between the tables.

Figure 2:
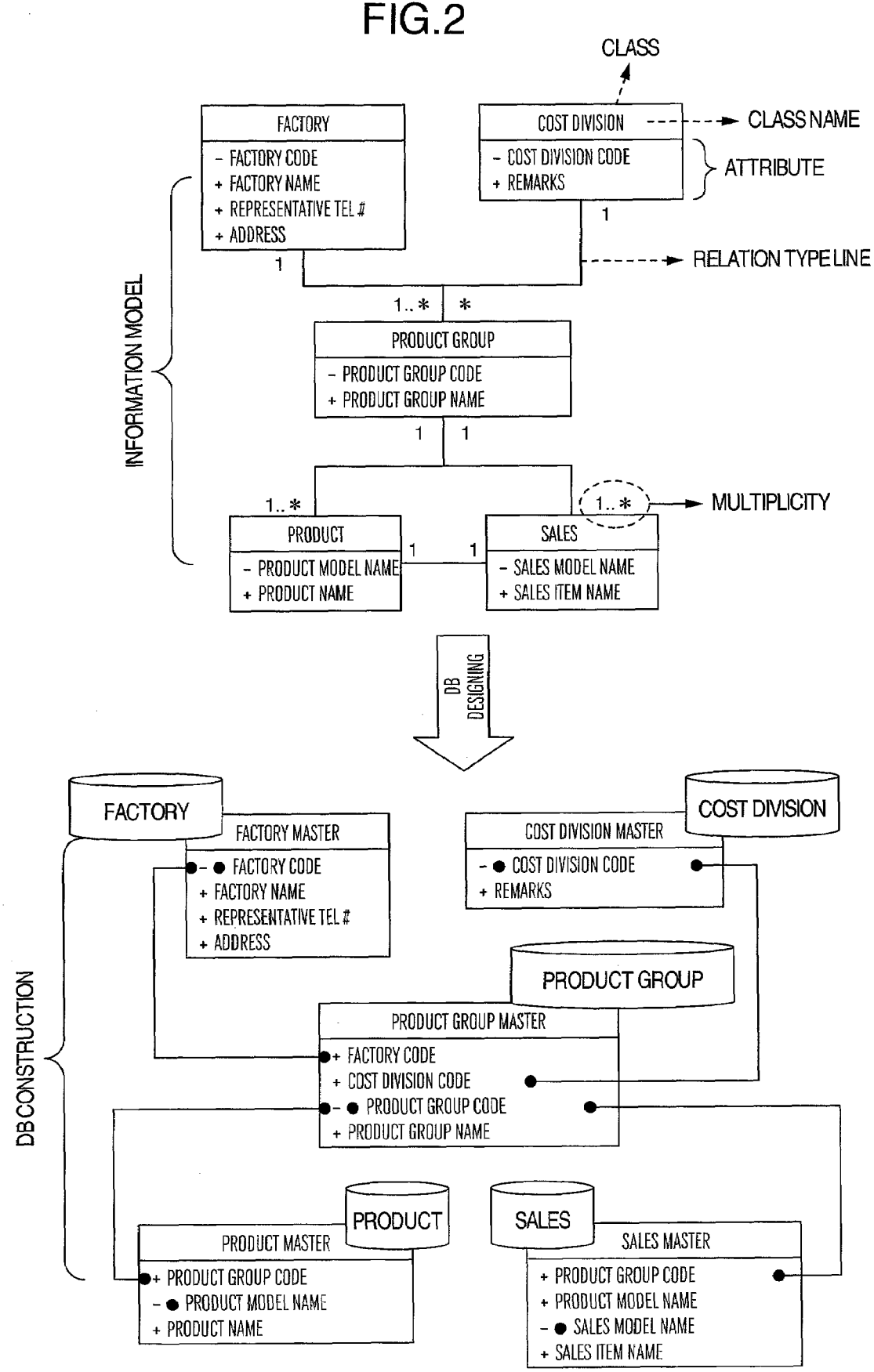
FIG. 2 is a diagram showing an example of structure of an information model in an embodiment and definitions of a database according to the present invention.

If a first class is part of a second class, namely, if a one-to-many correspondence exists between the first and second classes, the situation is called that the first class aggregates the second class. The degree of the aggregation is called "multiplicity" (indicated as "1", "1 . . . *", and so on by use of a relation type line between classes.) "Aggregation" is a particular form of "relation". In this regard, if the first and second classes are implemented in the form of tables, at least one attribute of the attributes belonging to the first class has a relation of a one-to-many correspondence with respect to attributes belonging to the second class. In FIG. 2, since one-to-many (at least one) correspondence exists between the factory class and the product group, the factory class has a relation to aggregate the product group.

The embodiment of the system to implement the information management method according to the present invention includes an information model input unit 102, a master controller 103, a master defining unit 103, a relating pin controller 106, a relating pin defining unit 107, an access path controller 109, an access path defining unit 110, and a retrieval processing unit 112. The constituent components of the system are communicably linked with each other by a network as shown in FIG. 1. The network includes the Internet, a public communication network, and the like.

Each of the devices described above includes a Central Processing Unit (CPU) and a memory having stored a program which is executed by the CPU to achieve a function thereof. The device also includes a secondary storage such as a magnetic disk drive on which a storage having stored the master table 105, the relation pin table 108, and the access path table 111 are mounted. The program accesses the tables. In the drawings, the devices are functionally divided into blocks and hence may be appropriately combined with each other.

Figure 15:
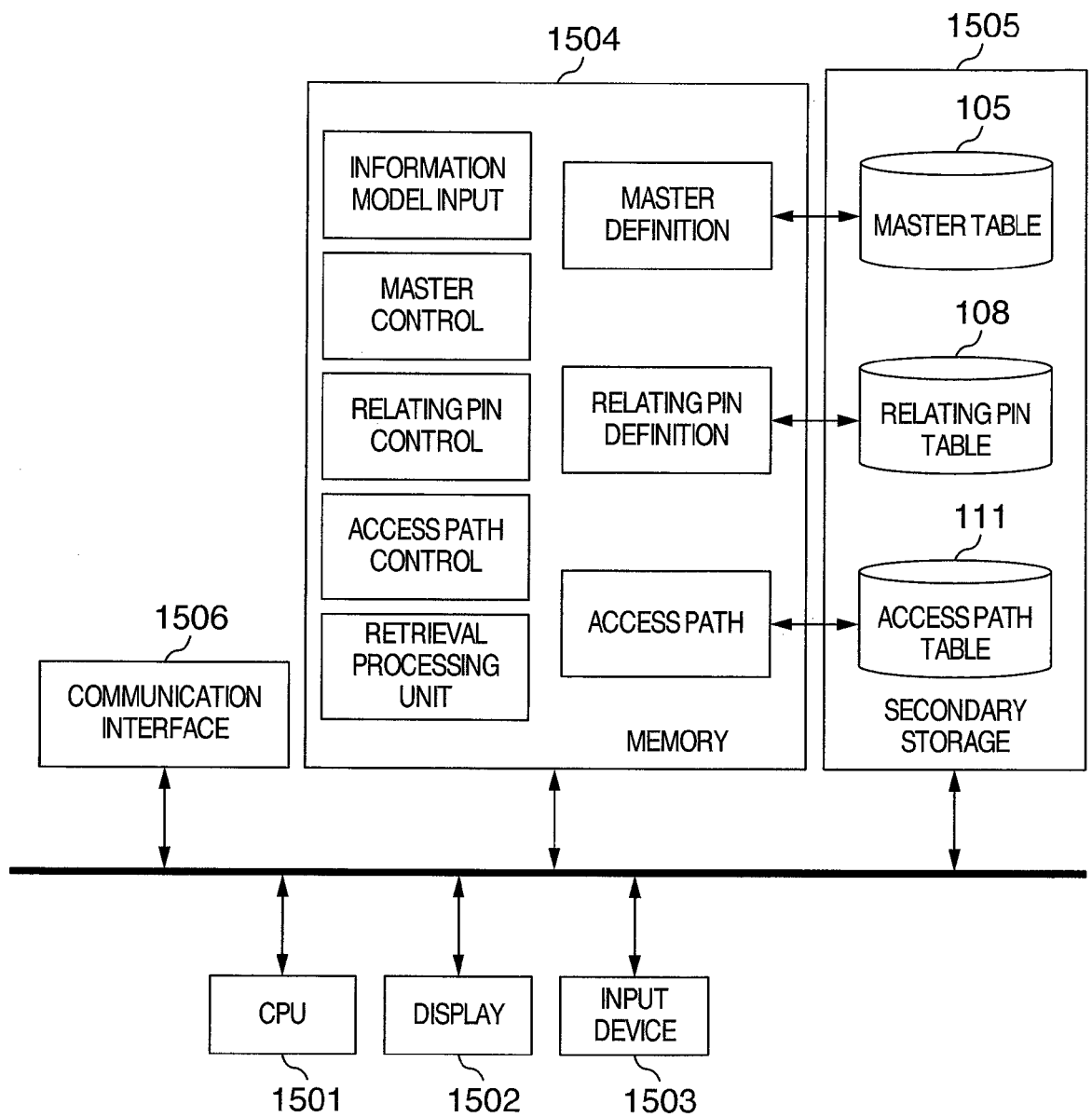
FIG. 15 is a block diagram showing an example of a hardware configuration of an embodiment of the information management system according to the present invention.

Each device of the system may include one or more server computers, Perchildal Computers (PC), or the like. As can be seen from FIG. 15, when the system includechilde computer, it is possible that each device described above is implemented by a program, which is loaded in a memory 1504 to be executed by a CPU 1501. In this situation, the network between the devices is not a physical network, but a logical network. The system further includes a secondary storage 1505 having stored the master table 105, the relating pin table 108, and the access path table 111, which are accessed by the program. Also in this case in which the devices are implemented using programs, the programs may also be separated or may be combined with each other.

The embodiment of the information management system includes an input device 1503 such as a keyboard or a mouse to receive input items of the information model, a display 1502 to display a management screen view, and an interface 1506 for the application program.

<Master Table Creation Processing>

Figure 3:
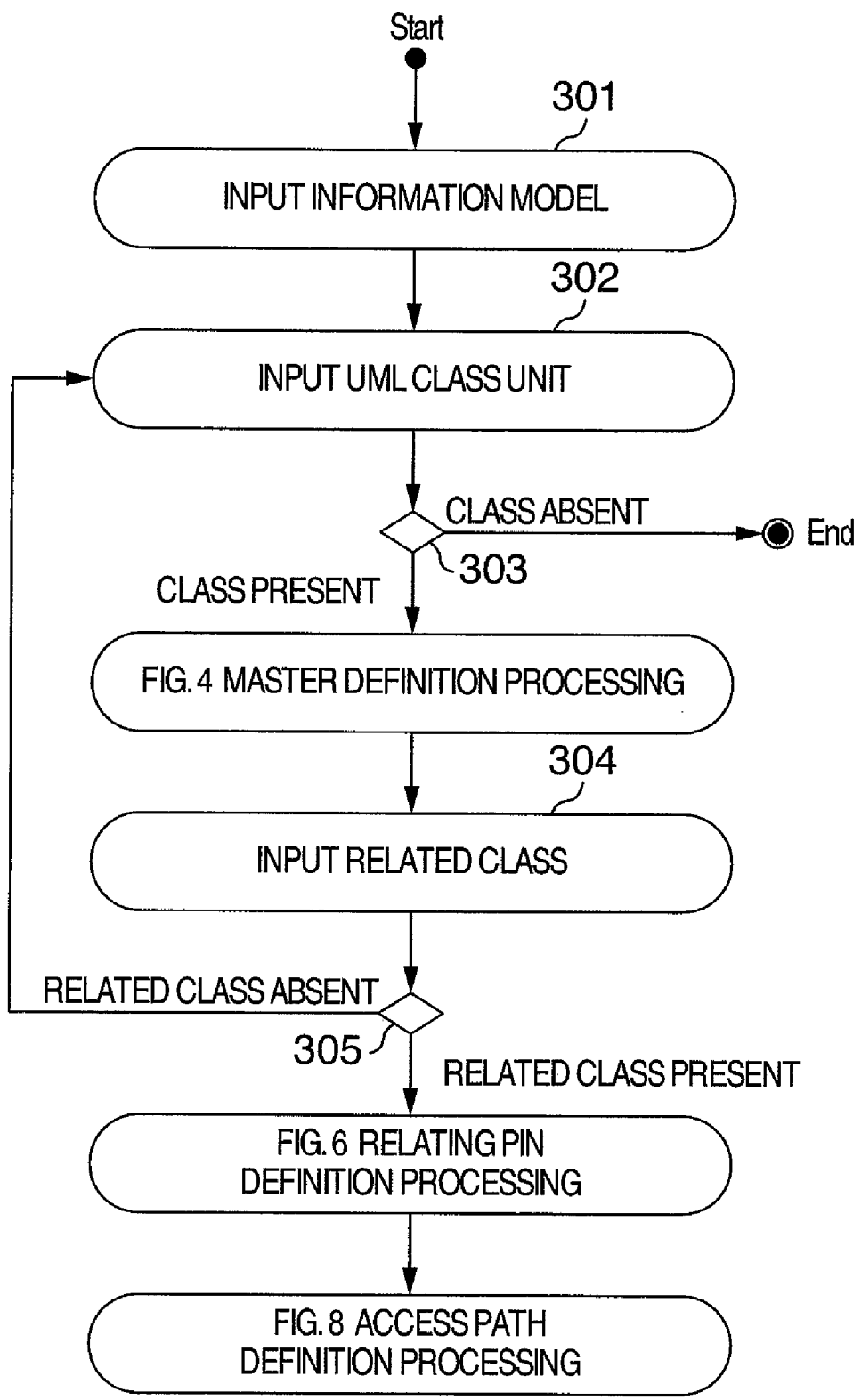
FIG. 3 is a flowchart of processing to input the information model.
Figure 4:
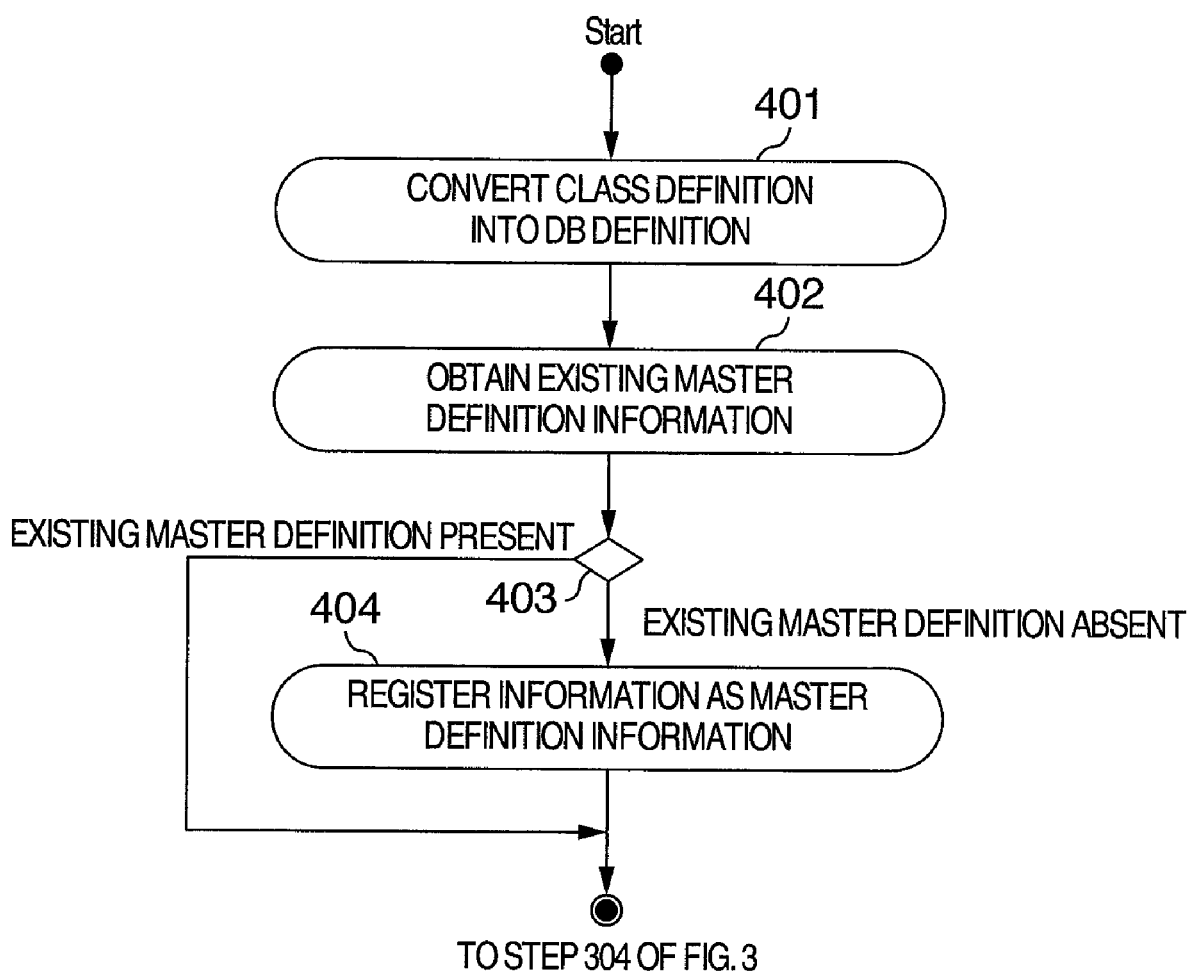
FIG. 4 is a flowchart of processing to automatically create master tables of the database using the information model.
Figure 8:
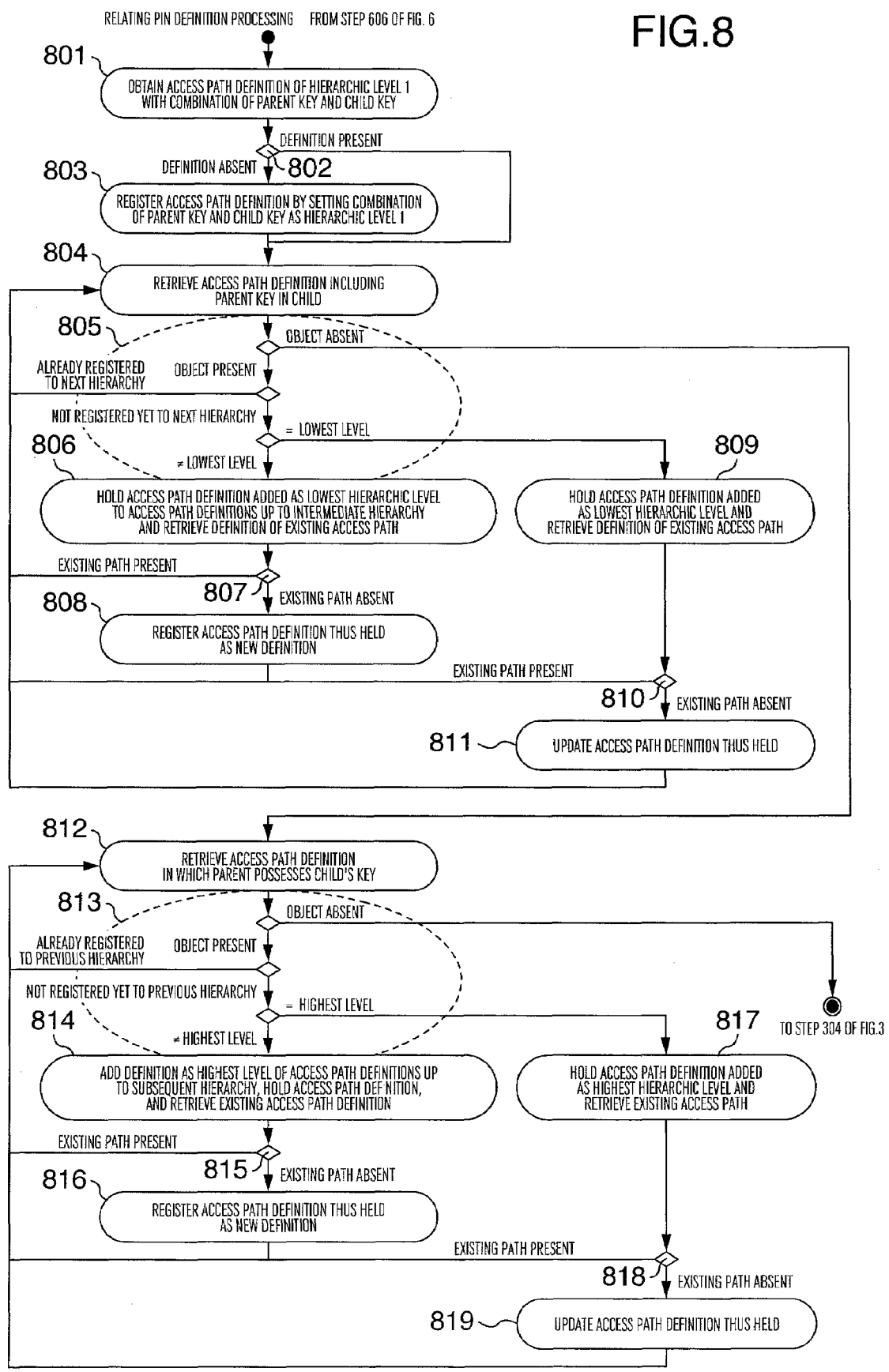
FIG. 8 is a flowchart of processing to automatically create access path tables using the information model.

FIG. 3 shows a processing flow of the input device 102 of FIG. 1 to input an information model. An information model is inputted as a batch in step 301. Items of the information model are further inputted in class units in step 302. In step 303, if there does not exist any item of a class, the processing is terminated. Otherwise, master definition processing of FIG. 4 is executed, and then associated classes are inputted in step 304. In step 305, if such class is absent, the process goes to step 302 to input a subsequent class. If the class is present, relating pin processing of FIG. 6 and access path definition processing of FIG. 8 are executed. The information model includes class names such as "factory", "cost division", "product group", "product", and "sales"; attributes belonging to the respective classes, relation type lines indicating relations between the classes, and multiplicity indicating a relation of multiplicity between the classes related by the relation type line to each other. Information of the information model includes identifier information such as a name of a class to hold attribute information in a group, identifier information such as a name of an attribute belonging to the class, relation type line information indicating names of two classes connected by a relation type line, and information of multiplicity. The information is stored in the storage 1505. In the input phase of the information model, the information is read from the storage 1505 to be used as input items. In FIG. 2, an attribute with a minus sign on the left side thereof is an attribute for which a key declaration is specified. The information model may be inputted from the input device 1503. Or, the information of the information model beforehand stored in the storage 1505 may be read therefrom to be inputted to the information model input device 102.

Figure 5:
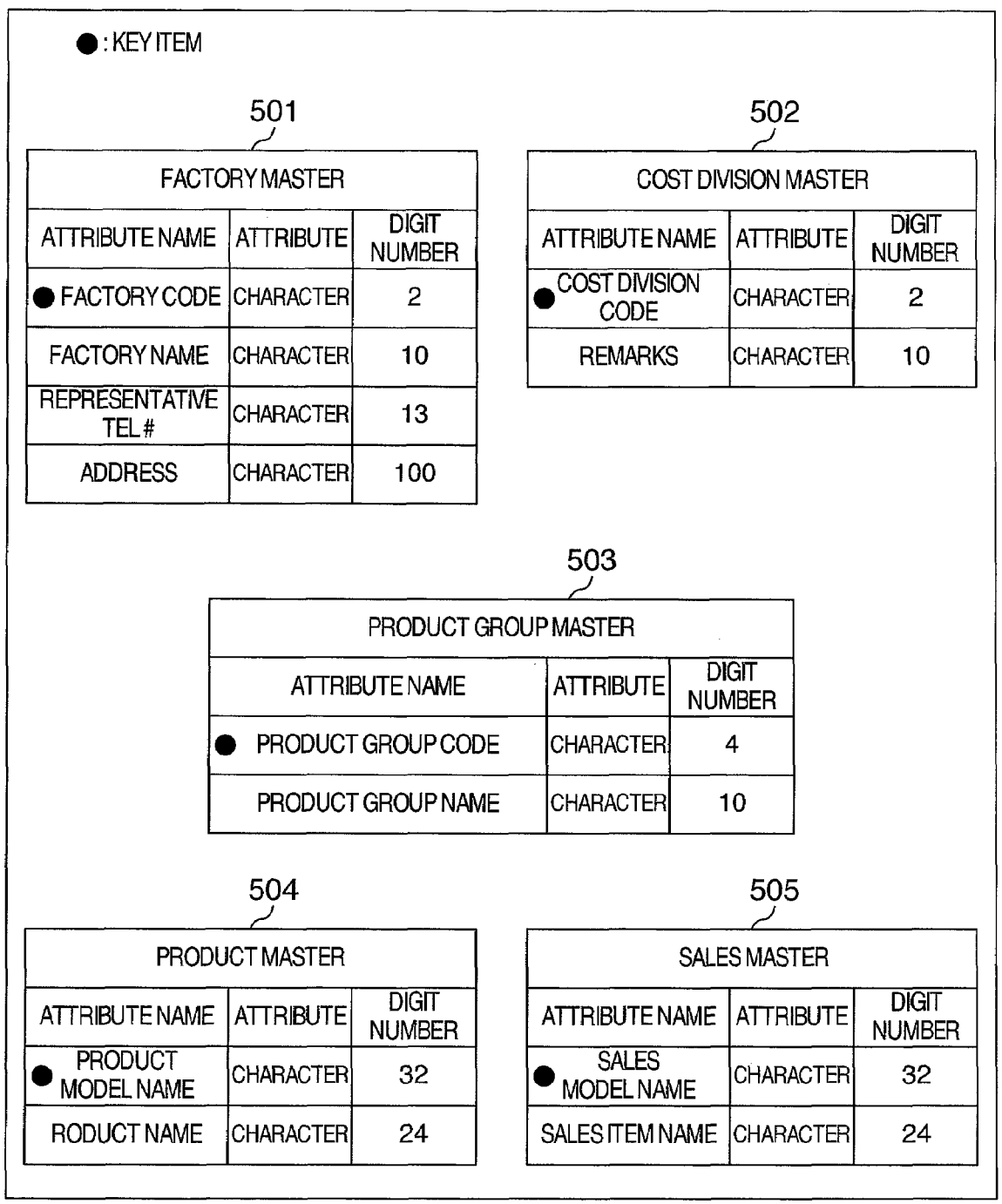
FIG. 5 is a diagram showing an example of master table definitions automatically generated using the information model.

FIG. 4 shows a flow of processing to be executed by the master controller 103 of FIG. 1. FIG. 5 shows an example of master table 105 of FIG. 1 created as a result of the processing. In step 401, the inputted information model is converted into database definitions. That is, according to the information of the information model, the master controller 103 creates table definition parameters including table names, data item names of the tables, table keys, and other attributes. For example, for the factory class in the UML notation of the information model 101 of FIG. 1, a table name is defined according to name assigning rule beforehand prescribed. As indicated by 501, the class name is converted as (class name+ "master") to obtain "factory master", which is defined as the table name. Attribute names defined in the factory class such as "factory code", "factory name", "representative telephone number", and "address" are defined as data item names of the table. Of the attributes defined in the information model 101, information for which the key declaration is specified is defined as a key of the table. Also, for the contents of each attribute, an attribute "character", "numeric value", or the like as well as the number of positions thereof are defined.

Next, in step 402, an existing master definition is obtained. In step 403, a check is made to determine whether or not the existing master definition is substantially equal to the master definitions converted in step 402. If such definition is absent, control goes to step 404 in which the existing master definition is registered to the master defining unit 104 for the management thereof.

Thereafter, the processing is similarly and repeatedly executed for all classes to resultantly create master definitions according to the inputs of a cost division class 502, a product group class 503, a product class 504, and a sales class 505.

While the production group class, the product class, and the sales class have relations to their parents in the information model of FIG. 2, these relations are not included in the master table definitions. This makes it possible to simply convert the respective contents of the information model into database definitions for the registration thereof.

<Relating Pin Registration Processing>

Figure 6:
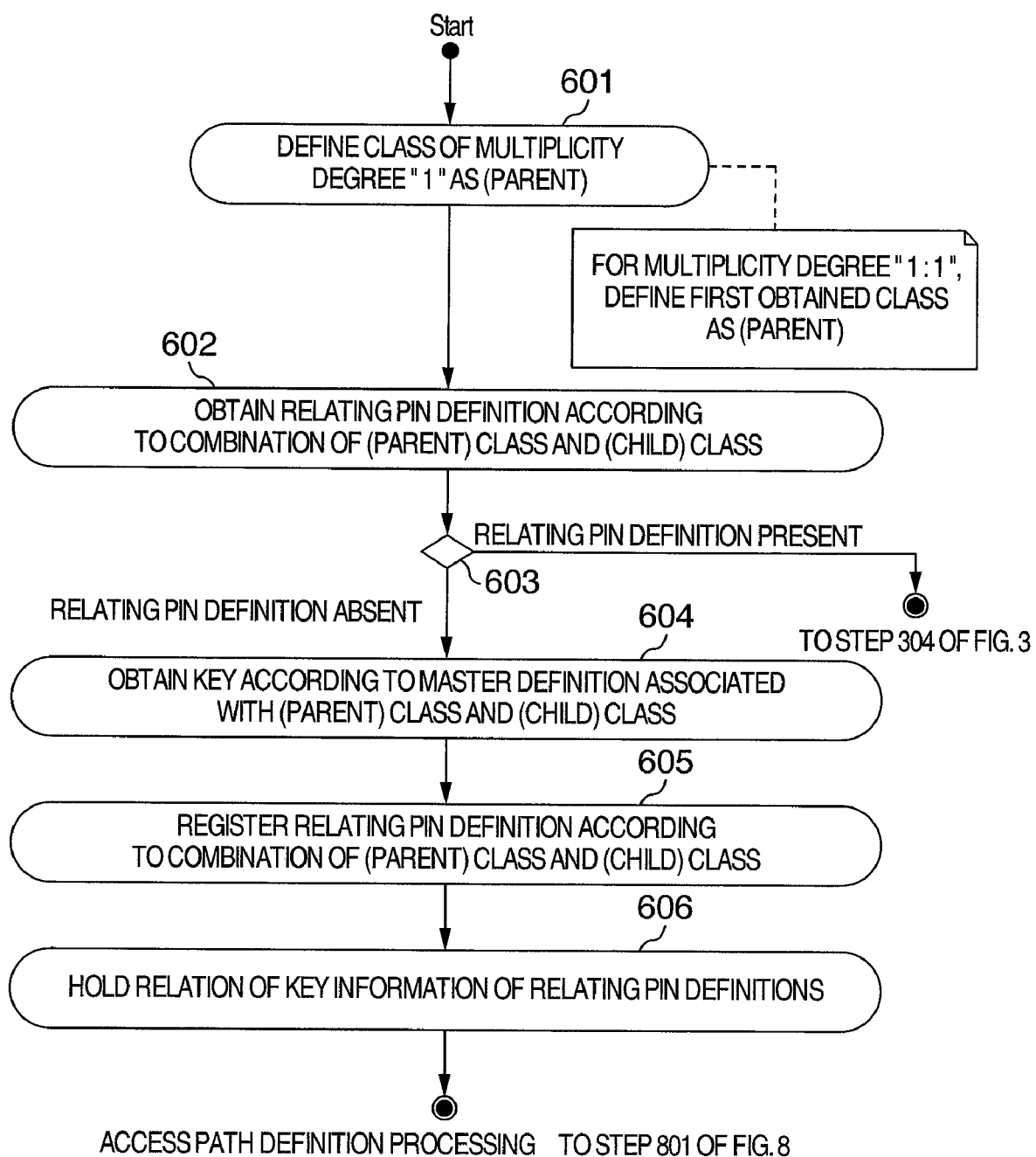
FIG. 6 is a flowchart of processing to automatically create relating pin tables using the information model.

FIG. 6 shows a processing flow of processing to be executed by the relating pin controller 106 of FIG. 1, and FIG. 7 shows an example of relating pin tables defined as a result of the processing. The term "relating pin" indicates a correspondence of keys for a relation between information. Information as a correspondence of keys between two tables is stored in each relating pin table. For example, in relating pin table 1 of FIG. 7, data of factory code A of the factory master is related to data of product group XX and data of product group YY of the product group master. In this way, the relating pin is realized by a correspondence between respective keys in the relation pin table.

In step 304 of FIG. 3, according to the relating type line information of FIG. 2, a second class related to the pertinent class is inputted. If such related class is absent as a result of judgment in step 305, the next class is inputted. Otherwise, the relation of the multiplicity of FIG. 2 is examined for the two classes (the pertinent class and the related class) in step 601. For the classes with a degree of multiplicity "1", one of the classes is defined as a parent and the remaining one thereof is defined as a child. However, if there exists a one-to-one equivalent relation therebetween, i.e., the classes are on one and the same level, the first obtained class is defined as the parent and the last obtained class is defined as the child. The judgment for the related class in step 305 can be conducted by determining whether or not the information of the information model stored in the storage 1505 includes a class associated by the relation type line information.

In steps 602 and 603, according to the combination of the parent class and the child class, a check is made to determine whether or not an existing combination is present by using the relating pin defining unit 107 of FIG. 1. If such combination is present, it is assumed that the definition has been registered to the relating pin table 108 of FIG. 1. Control then returns to step 304 of FIG. 3. If the combination is absent, a new relating pin table is to be registered. In steps 604 and 605, the key combination is set to the relating pin table name, the key item name is set to the data item name, and the attributes and the parent class key are set as the key of the relating pin table in the relating pin defining unit 107 to thereby create the relating pin table.

As a result, for example, for the factory class and the product group class of FIG. 2, the related class of the factory class is the product group class and the multiplicity is "one to one or more" (the asterisk indicates n, i.e., 1 . . . * indicates a value ranging from one to n). Therefore, the factory class is the parent and the product group class is the child. According to the combination, relating pin table 1 defined as shown in FIG. 7 is registered to the relating pin defining unit. Specifically, the factory code and the product group code as the keys of the combination are set as the table name of the relating pin table. The factory code and the product group are set as data item names of the table. Key attributes of the respective classes are set as attributes of respective data items of the table. The factory code is set as the key of the table itself.

The results of the defining operation include only the definition information in the relating pin table. The entity of the actual information is later registered by the application program 113 of FIG. 1 or the like using a generally known data base access method, for example, an SQL of Relational Data-Base (RDB). The entity of the information is defined such that a correspondence is established between a data item as a key of the parent class and one or more data items of child class keys. For example, a correspondence is established between identifier A corresponding to the factory code and identifiers XX and YY corresponding to the product group.

<Access Path Registration Processing>

Figure 9:
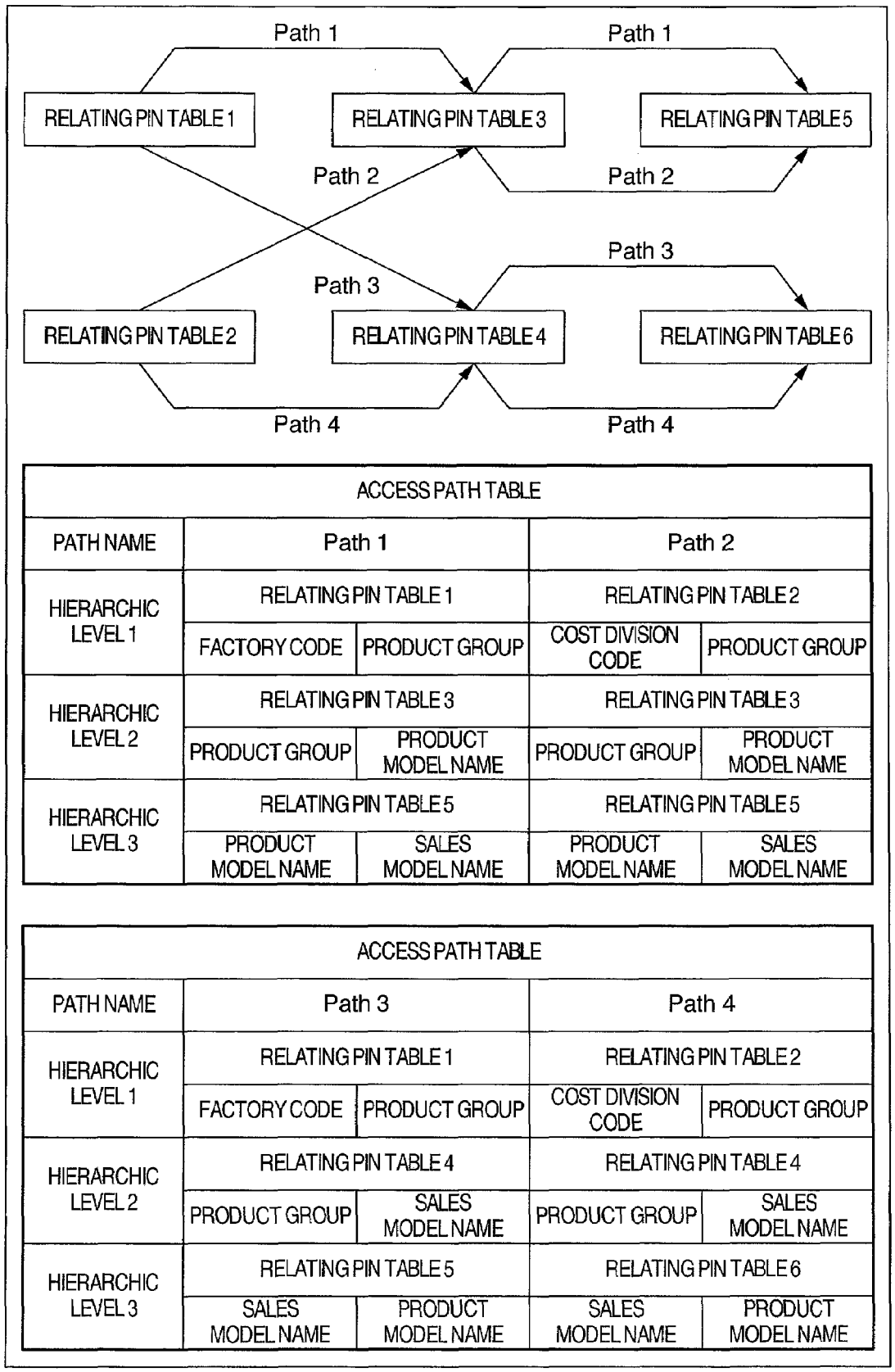
FIG. 9 is a diagram showing an example of relations between access path tables automatically generated using the information model and definitions of the tables.

The relating pin controller 607 creates access path definitions while holding the key combination thus processed. In this connection, FIG. 8 shows a processing flow of the access path automatic creation conducted by the access path controller 109 of FIG. 1, and FIG. 9 shows an example of the access path table 111 of FIG. 1 thus created.

An access path is information of a path to reach from a first table through successive relations between tables (access) a second table. As schematically shown in FIG. 9, the access paths are stored in access path tables as information items to hierarchically link the relating pin tables to each other.

In step 801, the access path controller 109 first obtains an existing access path definition corresponding to the key combination to determine in step 802 whether or not the definition has already been defined. If such definition is present, control goes to step 804. Otherwise, the controller 109 assigns an access path name according to a name assigning rule (to sequentially assign the value of n to Path "n" in this example), designates the relating pin table name and the parent and the child of the key to hierarchic level 1, and registers the table as a new access path table to the access path defining unit 110 of FIG. 1. In the access path table, the path name as information to identify the access path and the name of at least one relating pin table are stored with a correspondence to the hierarchic levels. The information to be stored in the access path table is not limited to the name of a relating pin table, but may be any information capable of identifying the table. In the successive hierarchies in which, for example, a child key of a relating pin table at hierarchic level 1 corresponds to a parent key of a relating pin at hierarchic level 2, the child key of a relating pin at an higher hierarchy corresponds to the parent key of a relating pin at a lower hierarchy.

According to an example of the situation in which the registration of a new access path is conducted using the combination of the factory class and the product group class shown in FIG. 2, the key combination of the factory class and the product group is set to hierarchic level 1 of access path table Path 1 together with "relating pin table 1" as the relating pin table name of FIG. 7. (In this state, hierarchic levels 2 and 3 have not been registered yet.)

Next, the access path controller 109 executes processing of hierarchic level additional registration to additionally register a hierarchic level to the existing access path table. In step 804, from the hierarchic levels of the access path tables registered in advance, the controller 109 selects a hierarchic level of which the child has a parent key of the relating pin to be additionally registered to the access path table. If such hierarchic level is absent, control goes to step 812. Otherwise, the controller 109 makes a check to determine whether or not a next hierarchic level subsequent to the obtained hierarchic level has already been registered. If the level has already been registered, control returns to step 804 for the next retrieval; otherwise, the controller 109 successively makes a check to determine whether or not it is possible to add the relating pin to the access path table.

The processing of the judgment differs depending on when the hierarchic level where a relating pin is to be added is an intermediate hierarchic level or a lowest hierarchic level of the access path table. If the level is the lowest hierarchic level, the next hierarchic level number is assigned to add the hierarchic level as the lowest hierarchic level. In an example of the processing in step 811 in which a combination of the product model name class and the sales model name class is to be added, if only hierarchic levels 1 and 2 have been registered as in Path 1 of FIG. 9, the combination above is additionally registered as hierarchic level 3. Since whether or not the existing access path is present has already been determined in steps 809 and 810, any duplicated access path registration does not occur as a result of the new combination registration described above.

On the other hand, in a case in which a relating pin is to be registered to an intermediate hierarchic level of an existing access path, if the registration is simply carried out, the path to the next hierarchic level is disconnected. To avoid this disadvantage, the relating pin is not immediately registered to the intermediate hierarchic level. In step 806, the access path controller 109 adds the relating pin, to the access path representing the subset of the existing access path, the subset ranging from the intermediate hierarchic level to the highest hierarchic level and holds the result of the addition. In step 807, the controller 109 makes a check to determine whether or not the access path has already been registered. If the path has already been registered, control returns to step 804 for the subsequent retrieval; otherwise, the controller 109 registers by the access path defining unit the result of the addition, i.e., the access path definition held in advance as a new access path to the access path table.

For example, if the retrieval is conducted for Path 1 of the access path table of FIG. 9 in the processing to register a relating pin of a combination of the product group class and the sales model name class, since the child at hierarchic level 1 is a product group, the relating pin is registered to the subsequent hierarchy level. However, if the subsequent hierarchy level has already been registered in this situation, the path to the level is disconnected by the processing. To avoid the disadvantage, the production group and the sales model name are added as hierarchic level 2 in addition to the contents of hierarchic level 1. If the combination is not present in the existing access path table, the result of the addition is additionally registered as shown in Path 3.

The processing of steps 804 to 811 is repeatedly executed until there exists no hierarchic level of the access path table of which the child has the parent key of the relating pin to be added.

If there exists such hierarchic level of the access path table of which the child has the parent key of the relating pin to be added, the controller 109 retrieves in step 813 the hierarchic level of the access path table of which the parent has the child key of the relating pin to be added. If the object or such hierarchic level is absent in step 813, control returns to step 304 of FIG. 3. Otherwise, the controller 109 makes a check to determine whether or not a hierarchic level has already been registered as the previous level preceding the obtained hierarchic level. If such hierarchic level has already been registered, control returns to step 812 for the subsequent retrieval. Otherwise, the controller 109 continuously makes a check to determine whether or not it is possible to add the hierarchic level to the access path table.

The processing of the judgment differs depending on when the hierarchic level to be added is an intermediate hierarchic level or a highest hierarchic level of the access path table. If the level is the highest hierarchic level, the subsequent hierarchic level numbers are changed respectively, and level no. 1 is assigned to the pertinent hierarchic level to thereby add the hierarchic level as the highest hierarchic level. This is implemented by the processing in step 816.

For example, in a case in which a factory code and a production group are to be registered in a case in which Path 1 of FIG. 9 includes a product group and a product model name at hierarchic level 1 and a production model name and a sales model name at hierarchic level 2, if it is desired to register a factory code and a production group, the factory code and the production group are to be added to the highest hierarchic level. That is, the hierarchic levels up to this point are shifted by one. After confirming through the processing in steps 814 and 815 that any access path does not exist in the other access path tables, the controller 109 executes processing to update the access path table associated with Path 1.

On the other hand, in a case in which the relating pin is registered to an intermediate hierarchic level, if the pin is directly register to the level of an existing access path, the path to the preceding hierarchic levels is disconnected. To avoid the disadvantage, the controller 109 does not directly register the relating pin to the access path, but adds the relating pin to the hierarchic level over the access path representing the subset of the existing access path, the subset ranging from the immediate level to the lowest level and then holds the result of the addition in step 814. The controller 109 then makes a check in step 815 to determine whether or not the path has already been registered. If the path is present, control returns to step 812 for the next retrieval; otherwise, the result of the addition held in advance is registered as a new access path table to the access path defining unit in step 816.

For example, if the retrieval is conducted for Path 1 of the access path table of FIG. 9 in the processing to register a combination of the cost division code class and the product group class, since the parent at hierarchic level 2 is a product group, the combination is registered to the preceding hierarchy level. However, if the preceding hierarchy level has already been registered in this situation, the path to the level is disconnected by the processing. To avoid the disadvantage, the cost division code class and the product group class are added as a higher level of the hierarchic levels 2 and 3, specifically, as hierarchic level 1. If the combination is not present in an existing access path table, the result of the addition is additionally registered as shown in Path 2.

Figure 10:
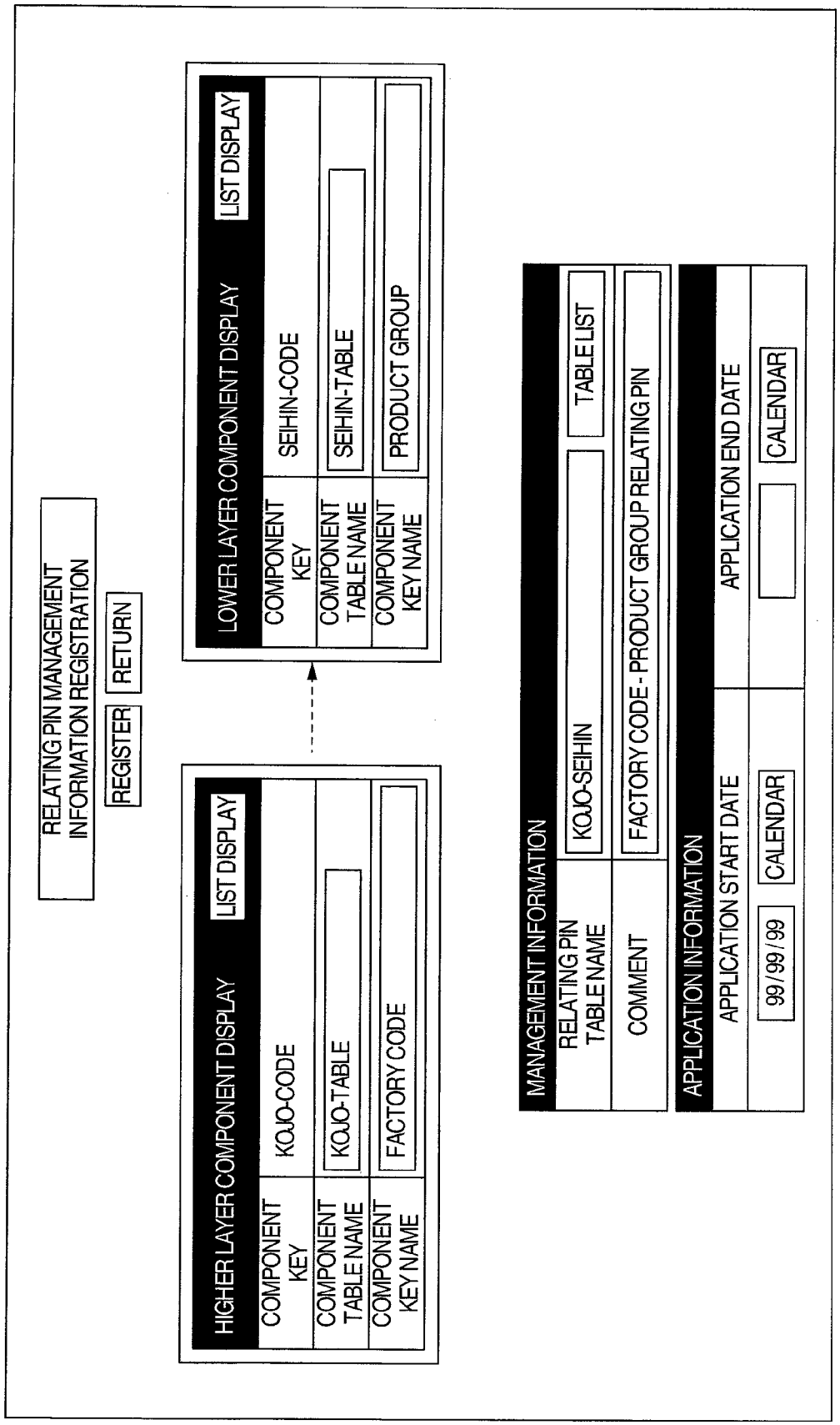
FIG. 10 is a diagram showing an example of a relating pin table maintenance screen according to an embodiment of the present invention.

The relation pin tables and the access path tables can be created through the processing described above. However, for example, the manager can produce these tables by use of screen images without reading the information model such as an information model of UML. FIG. 10 shows an example of a screen image for the relating pin table maintenance. Like in the method in which the information model is passed from the management screen to the input device 102 to resultantly create the relation pin tables and the access path tables, it is possible in this method that these tables are created, updated, and deleted through operations using the screen images (although the example of FIG. 10 is a relating pin table maintenance screen, a screen view for the access path table maintenance is also configured in a similar layout).

<Relating Pin Deletion Processing>

The new registration and the update of a relating pin table and an access path table as well as the deletion of an access path table can be conducted without any problem. However, the deletion of a relating pin table and the deletion of a hierarchic level in an access path table lead to the disconnection of the access path. To cope with the difficulty, the access path controller 109 recognizes and executes processing as below.

Figure 11:
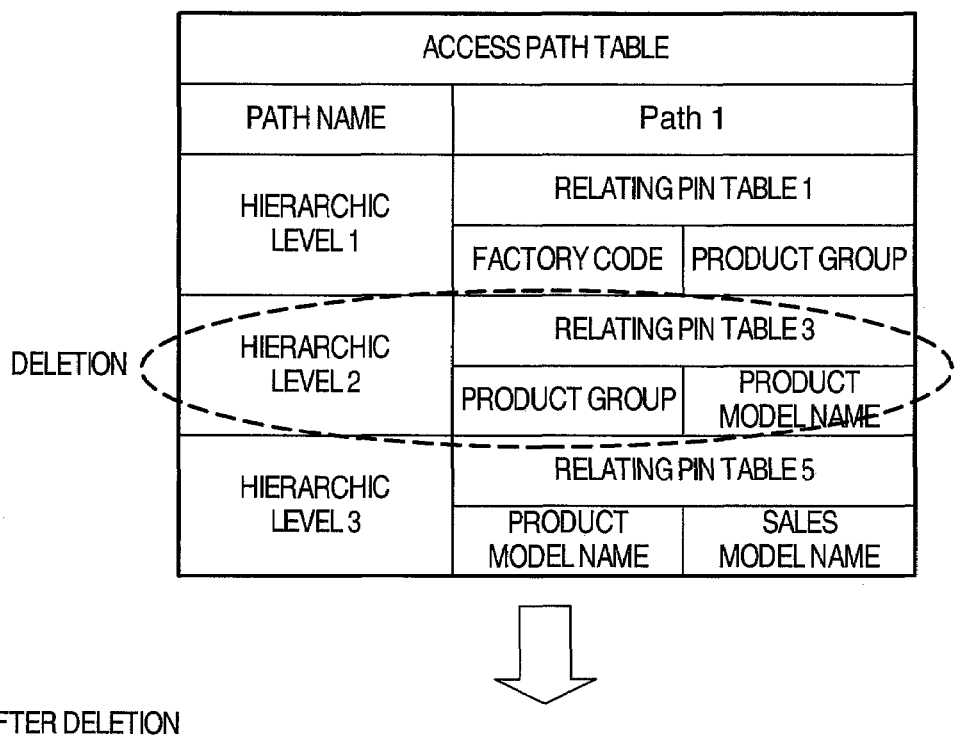
FIG. 11 is a diagram showing an example of automatic change of an access path table at deletion of a relating pin table according to an embodiment of the present invention.

Assume, for example, that the relating pin table 3 is not necessary in Path 1 of FIG. 11 and hence the manager deletes the table 3 using the maintenance screen view of FIG. 10. Since Path 1 does not include a relating pin table at hierarchic level 2, it is not possible for the retrieval processing unit to follow the path from relating pin table 1 to relating pin table 5 in the data retrieval. Therefore, the access path controller 109 executes processing to register the subsequent hierarchic level (relating pin table 5) as a new access path (path 5 of the access path table after deletion in FIG. 11). The controller 109 executes processing in which by remaining only hierarchic level 1, the access path definition is automatically updated by the access path defining unit 110 (path 1 of the access path table after deletion in FIG. 11).

Similarly, even if the relating pin in an intermediate hierarchic level other than hierarchic level 2 is deleted from the access path table by the manager, the processing is executed in almost the same way. Even if a relation of the unnecessary information is deleted, the required access paths are remained for the update of the table. This enables to cope with any change in the relations.

<Retrieval Processing>

Figure 12:
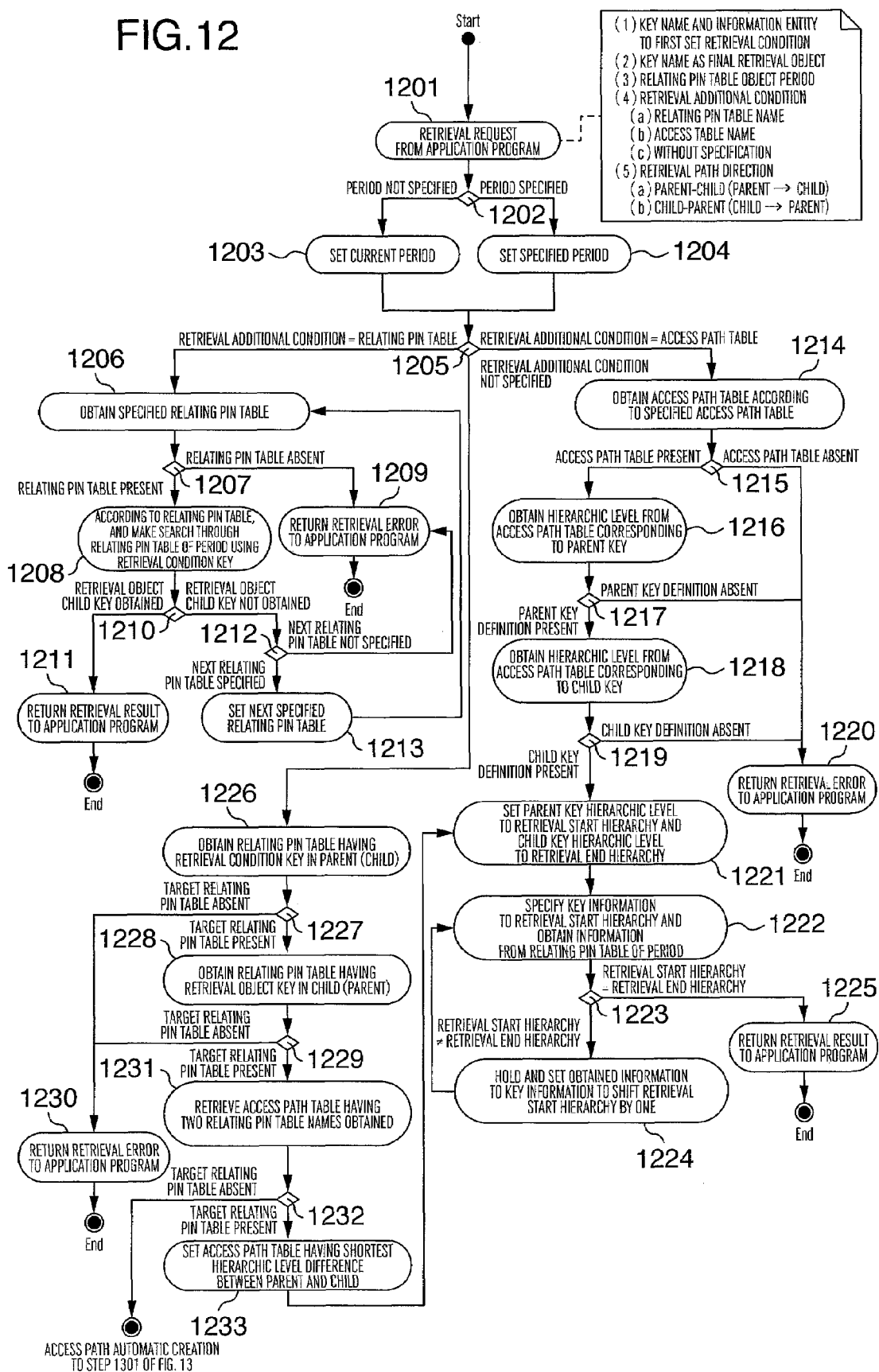
FIG. 12 is a flowchart of an information retrieval method used by an embodiment of an application program according to the present invention.

Referring to FIG. 12, description will be given of the processing flow of the retrieval processing executed by the retrieval processing unit 112 of FIG. 1 using the application program. The retrieval processing condition of the application program is designated in step 1201. The condition includes the key name and the entity of information employed as the retrieval condition and the key name as the final retrieval object. In addition, it is possible to specify the period of the relating pin table as the retrieval object and the retrieval route in an upper or lower direction ("from the parent to the child" or "from the child to the parent"). Moreover, the additional retrieval condition is designated in one of the three modes. That is, a relating pin table, an access path table, or neither thereof is specified.

(Retrieval by Designating Period)

In the designation of the period of the relating pin table, it is possible to hold a plurality of relating pin tables which are substantially equal in structure to each other and which differs from each other in the period indicated by information of the day and time as shown in an example of FIG. 14. There exists a case in which a change takes place in the relations of the information due to, for example, a change in the organization. To cope with the situation, if the information in the relating pin tables are beforehand changed to be prepared for the future use, when the CPU recognizes the start point of a particular period, the relating pin table associated with the particular period becomes effective and hence the retrieval result is changed. Therefore, it is possible to beforehand prepare for various structural changes in the firm. Additionally, since it is possible to hold the structure of relations of the future, the relating pin tables can be used by the application program for an operation such as simulation. Also, various totals can be obtained according to the relations of the past. If the application program designates in step 1201 the period (dates of validity) of the relating pin table for use thereof, the dates are set in steps 1202 and 1204. Even if the dates are not designated, the current dates in the processing are set in step 1203. Thereafter, the retrieval processing is executed using the relating pin tables valid during the designated period.

Description will now be given of a concrete example of the retrieval processing according to FIG. 14. During the period from Apr. 1, 2004 to Sep. 30, 2004, factory code A corresponds to product groups XX and YY, factory code B corresponds to factory group ZZ, and factory code C corresponds to product group WW. During the period from Oct. 1, 2004 to Mar. 31, 2005, factory code A corresponds to product groups XX and YY, factory code B corresponds to factory group YY, and factory code C corresponds to product group WW. That is, in this example, factory B terminates the production of product group ZZ and starts the production of product group YY on Oct. 1, 2004. In this situation, to a request to extract all product group names of the factory identified by factory code B, the system returns data corresponding to product group ZZ up to Sep. 30, 2004 and then returns data corresponding to product group YY beginning at Oct. 1, 2004.

(Retrieval with Designation of Relating Pin Table)

In the retrieval with designation of a relating pin table as an additional retrieval condition, the application program checks in step 1205 the additional retrieval condition set in step 1201 to execute the retrieval processing using the designated table. Since a plurality of relating pins can be designated, the program accesses in step 1206 the relating pin defining unit to determine absence or presence of the first designated relating pin table. As a result of judgment in step 1207, if the table is absent, control goes to step 1209 to return an error message to the application program.

In a case in which the pertinent relating pin table is present as a result of the judgment in step 1207, if the path designation includes an item of "parent-child", the retrieval processing unit 112 designates in step 1208 a parent key using the retrieval condition key and the information entity to obtain the contents of the associated child key if the path designation includes an item of "child-parent", the unit 112 designates a child key using the retrieval condition key and the information entity to obtain the contents of the associated parent key. After the contents are completely obtained, the unit 112 determines in step 1210 whether or not information of the key as the retrieval object has been obtained. If the information has been obtained, the result thus obtained is returned to the application program in step 1211. Otherwise, the unit 112 makes a check in step 1212 to determine whether or not the application program has designated a subsequent relating pin table. If the table has not been designated, the unit 112 returns an error message to the program. Otherwise, the unit 112 sets the subsequent relating pin table in step 1213 to return to step 1206. The unit 112 repeatedly executes the retrieval processing until the retrieval object key is detected.

In the information returning phase, it is possible to return only the finally retrieved information. However, the retrieval results obtained at intermediate points of the retrieval processing are also retained in the unit 112 to use as an information entity for a next retrieval key. Therefore, it is possible to return not only the finally retrieved information, but also the information obtained as the intermediate results. Furthermore, the retrieval route may be designated in both directions of relations, specifically, from the parent to the child and vice versa.

When the target retrieval information is detected, the detected information is information having a relation with particular information. In a case in which it is desired to obtain the detected information as well as the attributes thereof, the application program designates the master name and the attribute names in the interface for the call. Then, the contents of the master table can be obtained via the relating pin controller and the master defining unit.

(Retrieval with Designation of Access Path)

When an access path is designated in the additional retrieval condition, the retrieval processing unit 112 conducts the retrieval by use of an access path table according to judgment of step 1205. The unit 112 obtains in step 1214 the access path designated by the access path name in the additional retrieval condition. If the access path is absent as a result of the judgment in step 1215, an error message is returned to the application program in step 1220. Otherwise, the unit 112 determines in steps 1216 and 1218 a hierarchic level of the access path at which the parent and child keys for the retrieval exist to set the hierarchic level. (If the retrieval path designation includes an item of "parent-child", the retrieval condition key is compared with the parent key of the relating pin of each hierarchic level and the retrieval object key is compared with the child key thereof. If the retrieval path designation includes an item of "child-parent", the retrieval condition key is compared with the child key of the relating pin of each hierarchic level and the retrieval object key is compared with the parent key thereof. If there exist a relating pin corresponding to the retrieval condition key and a relating pin corresponding to the retrieval object key, hierarchic levels are set respectively to these relating pins). As a result of judgment in steps 1217 and 1219, if it is determined that the designated retrieval condition key and the designated retrieval object key are not present in any hierarchic level of the access path, an error message is returned to the application program in step 1220.

If there exist a retrieval condition key and a retrieval object key corresponding to relating pins of hierarchic levels of the access path, the retrieval start hierarchy and the retrieval end hierarchy are set in step 1221 as below. If the retrieval path designation includes an item of "parent-child", the hierarchic level of the parent key is set to the retrieval start hierarchy and that of the child key is set to the retrieval end hierarchy. If the retrieval path designation includes an item of "child-parent", the hierarchic level of the child key is set to the retrieval start hierarchy and that of the parent key is set to the retrieval end hierarchy. The retrieval is first started for a relating pin table which is selected from the relating pin tables designated at the retrieval start hierarchic level and which is effective during the designated period. If the retrieval path is in the "parent-child" direction, the information entity of the parent key is set to obtain information of the child key. If the retrieval path is in the "child-parent" direction, the information entity of the child key is set to obtain information of the parent key. If the retrieval start hierarchy is equal to the retrieval end hierarchy as a result of judgment in step 1223, the retrieval result is returned to the application program in step 1225.

If the retrieval start hierarchy is other than the retrieval end hierarchy, the target hierarchy has not been reached yet. In step 1224, the retrieval start hierarchy is decremented by one if the retrieval designation includes an item of "parent-child". Or, the hierarchy is incremented by one if the retrieval designation includes "child-parent". The previously obtained information is set as the retrieval condition key and then control returns to step 1222 to repeatedly conduct the retrieval of the associated relating pin table. The processing is repeatedly executed until the retrieval start hierarchy reaches the hierarchic level of the retrieval object key to thereby obtain the target information. The information returning operation is conducted as in the retrieval with the designation of the relating pin table. That ichildly the final result may be returned or the final result and the intermediate results may be returned.

According to the processing scheme, there may be employed a plurality of modes for the retrieval in a range from the highest hierarchy to the lowest hierarchy of the access path table. Specifically, the retrieval may be conducted beginning at an intermediate point of the hierarchic level, for all lower hierarchic levels beginning at a desired hierarchic level, or for all higher hierarchic levels beginning at a desired hierarchic level. Even if the hierarchic level of the information structure is known, the application program can specify the retrieval condition. It is not required to know relations appearing at intermediate points of the retrieval. Therefore, even if a change takes place in the relations, the interface of the application program is advantageously kept unchanged.

(Retrieval without Designation of Relating Pin Table and Access Path Table)

Description will be given of the retrieval processing when neither the relating pin table nor the access table is designated as the additional retrieval condition. In step 1205, if it is determined that the additional retrieval condition is absent, an existing access path is detected to internally set the access path to conduct the retrieval using the access path table. Or, relating pin tables corresponding to the retrieval condition are detected to conduct the retrieval by combining the detected relating pin tables. In this operation, after the retrieval is finished, the retrieved combination of the relating pins is registered to the access path table.

Description will now be given of the retrieval to be conducted by detecting an access path table. In steps 1226 and 1228, if the retrieval path designation includes an item of "parent-child", a relating pin table having the retrieval condition key as the parent key and a relating pin table having the retrieval object key as the child key are respectively retrieved and obtained. If the retrieval path designation includes an item of "child-parent", a relating pin table having the retrieval condition key as the child key and a relating pin table having the retrieval object key as the parent key are respectively retrieved and obtained. Through the judgment in steps 1227 and 1229, if it is determined that at least one of the relating pin tables is absent, an error message is returned to the application program in step 1230.

If the relating pin corresponding to the retrieval condition and that corresponding to the retrieval object are present, a search is made in step 1231, using as a search key, the relating pin table names of the relating pins to obtain an access path in which the relating pin tables are defined in hierarchic levels. If such access path is absent, control goes to step 1301 of FIG. 13 to execute access path judge processing using the relating pin table. Otherwise, the hierarchic level of the relating pin corresponding to the retrieval condition key is set as the retrieval start hierarchy and that of the relating pin corresponding to the retrieval object key is set as the retrieval end hierarchy to execute retrieval processing in step 1222 as in the retrieval processing with designation of an access path table. As a result of the retrieval, if a plurality of access path tables are obtained, one of the tables which has a smallest difference in the hierarchic level between the parent and the child is selected as a candidate. The candidate is then passed to the step 1222. As a result of the processing, there can be determined an access path table having efficient performance.

Figure 13:
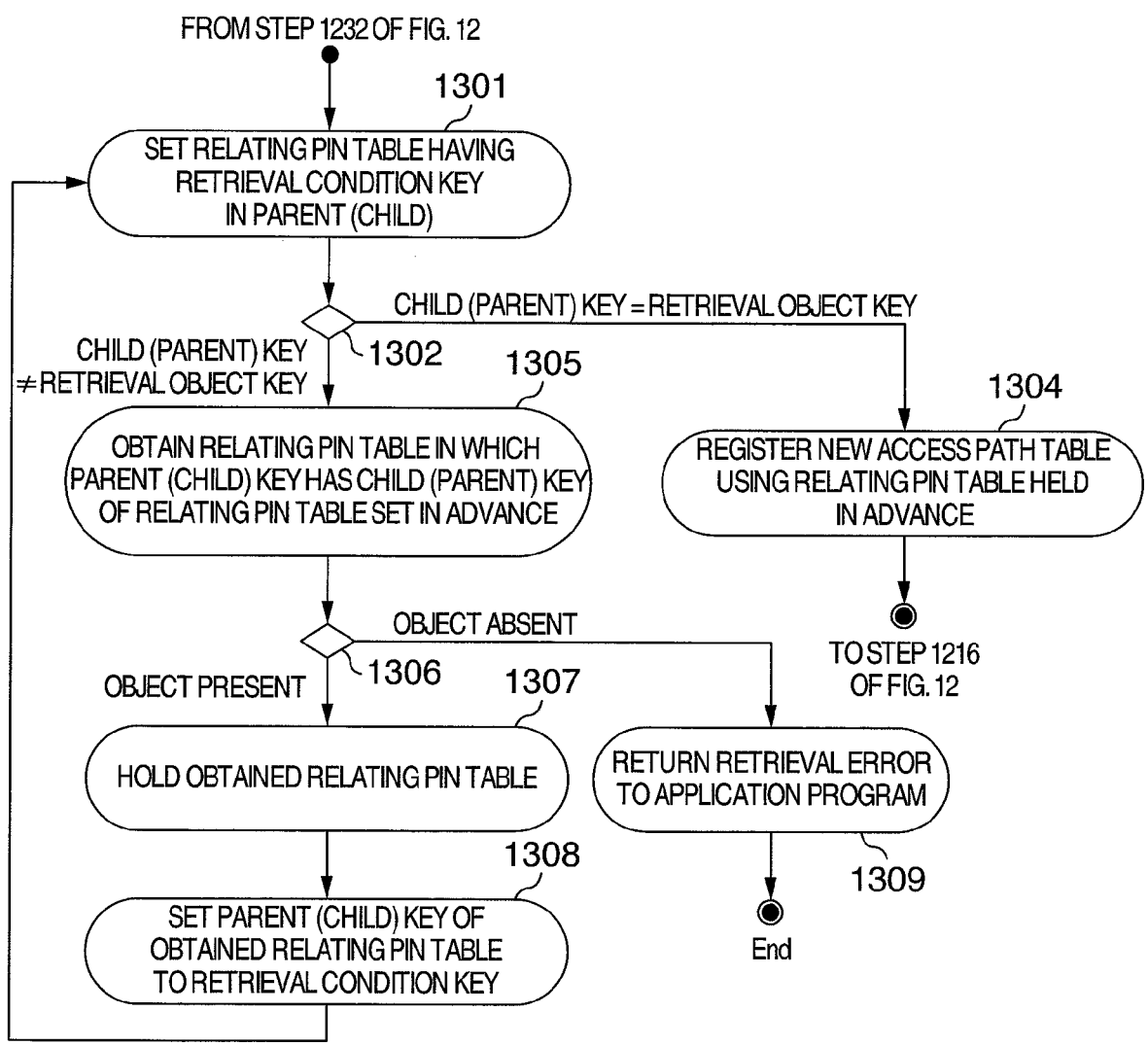
FIG. 13 is a flowchart of an information retrieval method used by an embodiment of an application program according to the present invention in which neither the relating pin table nor the access path table is specified.

Referring next to FIG. 13, description will be given of the processing when neither the retrieval condition key nor the retrieval object key is present for the access path table. In step 1301, if the retrieval path designation includes an item of "parent-child", the retrieval condition key is set as the parent key and the retrieval object key is set as the child key. If the retrieval path designation includes an item of "child-parent", the retrieval condition key is set as the child key and the retrieval object key is set as the parent key. In step 1302, a check is made for the relating pin table, which is obtained because the relating pin corresponds to the retrieval condition key, to determine whether or not the table includes the retrieval object key (if the retrieval path designation includes an item of "parent-child", the retrieval object key is compared with the child key; if the retrieval path designation includes an item of "child-parent", the retrieval object key is compared with the parent key). As a result, if the table includes the retrieval object key, it means that the retrieval has been conducted through a retrieval route from the retrieval condition key to the retrieval object key using the combination of the retrieved relating pin table. The combination order of the related pin table is set as the hierarchic level of the access path table. According to the related pin table, a new access path table is registered in step 1304. To retrieve actual information using the access path table, control goes to the processing flow of the access path controller, specifically, step 1215 of FIG. 12 to execute actual retrieval processing.

If the associated relating pin table is not reached as a result of judgment in step 1302, the definition of the relating pin table is held in step 1307. If the retrieval path designation includes an item of "parent-child", the parent key of the retrieval object key is set to the retrieval condition key. If the retrieval path designation includes an item of "child-parent", the child key thereof is set to the retrieval condition key. Control then returns to step 1301 to repeatedly conduct the retrieval of the relating pin table. If the relating pin table has not been obtained in step 1305, it is assumed that the combination of relating pin tables as a route from the retrieval condition key specified by the application program to the retrieval object key specified by the application program is absent. An error message is hence returned to the application program 1309. According to the embodiment described above, there are provided an information management system and a method for use with the same. The system includes a unit to generate DB table definitions using an information model like that described in UML, a unit to create, to modify, and to delete a table to hold relations between data item of a table and the other data item of the other table, a unit to create, to update, and to delete a table for access control to conduct an access operation by tracing the relation, a retrieval processing unit to efficiently execute access processing, and a unit to return relating information according to a period of the relation. Therefore, an information model is developed to employed in the DB designing phase such that the relating relation and an access path thereto are created to be managed independently of the table definition of the information. When a retrieval condition key and its contents and a final retrieval object key are received from the application program, the target information is retrieved and is returned to the application program. As a result, the retrieval processing is executed with a reduced number of accessing operations to thereby improving the access efficiency.

Using the information model obtained through the information analysis, the DB table definitions can be created in the form of a master table. Relations between information and access paths to information can be automatically created as a relating pin table and an access path table. In response to a retrieval condition from an application program, even if an access path for the retrieval is absent, an access path can be created according to the retrieval condition. Also after the access path is created, it is possible to additionally create an access path as well as to modify and to delete the access path.

In a process to retrieve the target information, even there exist a plurality of relations in multi-stage structure, the information retrieval is conducted through a path to the target information using the access path defined in advance to thereby reduce the period of time required to retrieve the information.

The relations between information are configured to be held for a plurality of periods of time, and hence there can be provided an information management system and a method for use therewith capable of flexibly coping with changes in the information configuration. When a change occurs in relations between information or such change is predicted, the relations between information can be managed according to the periods described above. Therefore, the information can be used according to advance definitions prepared in advance or the information obtained in the past can be used. This leads to an advantage that even when a change occurs in the structure of the relations, the retrieval interface of the application program can be used without any modification thereof.

The period of the relating pin table is applicable to the past, the present, and the future, namely, a plurality of periods are applicable to the relating pin table and are held in the system. Therefore, by designating the period of the master table and that of the relating pin in an independent fashion, data of a first period can be used in the information processing by use of a relating pin of a second period other than the first period. Even if the relations between data items of varying tables are changed during, for example, one fiscal year due to a change in the organization or the like, it is not required to prepare two kinds of master tables. That is, if the application program designates the master table before the organization change and that after the organization change, there can be conducted the totaling of data in consideration of the new organization. It is therefore not necessary to check and to modify the data totaling procedure and data including information of the organization. Furthermore, if the application program designates a virtual relating pin table of the future, it is possible to conduct simulation, for example, the totaling of data in a virtual organization.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An information management method in an information management apparatus having an information processor which performs a retrieval process based on information input via an input unit and information stored in a storage unit, the method performed by the information processor comprising the steps of:
preparing plural relating pin tables, each of which includes plural records for associating parent key information with child key information, and storing the plural relating pin tables in the storage unit;
preparing plural access path tables, each of which hierarchically links between the plural relating pin tables, and storing the plural access path tables in the storage unit;
obtaining parent key information and child key information, both of which are input via the input unit;
referring to the plural relating pin tables, specifying a first relating pin table stored therein including the input parent key information and a second relating pin table stored therein including the input child key information;
referring to the plural access path tables, retrieving access path tables including the first relating pin table and the second relating pin table;
if more than two access path tables are retrieved in the access path tables retrieving step, specifying, from the retrieved access path tables, one access path table having a shortest distance between a first hierarchic level to which the input parent key information belongs and a second hierarchic level to which the input child key information belongs; and
performing a retrieval process based on the specified access path table, the input parent key information, and the input child key information.

2. The information management method according to claim 1,
further comprising the step of:
obtaining identifiers of the relating pin tables via the input unit,
wherein the information processor performs the retrieval process based on the input parent key information, the input child key information, and the relating pin tables identified by the obtained identifiers.

3. The information management method according to claim 1, further comprising the step of:
obtaining an identifier of the access path table via the input unit,
wherein the information processor performs the retrieval process based on the input parent key information, the input child key information, the access path table identified by the obtained identifier.

4. The information management method according to claim 2, further comprising the step of:
obtaining relating pin effective period information via the input unit,
wherein each relating pin is stored with its effective period information in the storage unit, and
the information processor performs the retrieval process based on the input parent key information, the input child key information, the relating pin tables identified by the obtained identifiers and the obtained period information.

5. An information management apparatus comprising:
an input unit;
a storage unit; and
an information processor which performs a retrieval process based on information input via the input unit and information stored in the storage unit; wherein the storage unit stores plural relating pin tables, each of which includes plural records for associating parent key information with child key information in the storage unit, and plural access path tables, each of which hierarchically links between the plural relating pin tables;
wherein the information processor:
obtains parent key information and child key information, both of which are input via the input unit;
referring to the plural relating pin tables, specifies a first relating pin table including the input parent key information and a second relating pin table including the input child key information;

referring to the plural access path tables, retrieves access path tables including the first relating pin table and the second relating pin table;

if more than two access path tables are retrieved, specifies, from the retrieved access path tables, one access path table having a shortest distance between a first hierarchic level to which the input parent key information belongs and a second hierarchic level to which the input child key information belongs; and performs a retrieval process based on the specified access path table, the input parent key information, and the input child key information.

6. The information management apparatus according to claim 5, wherein the information processor obtains identifiers of the relating pin tables via the input unit, and performs the retrieval process based on the input parent key information, the input child key information, and the relating pin tables identified by the obtained identifiers.

7. The information management apparatus according to claim 5, wherein the information processor obtains an identifier of the access path table via the input unit, and performs the retrieval process based on the input parent key information, the input child key information, and the access path table identified by the obtained identifier.

8. The information management apparatus according to claim 6, wherein:

the storage unit stores each relating pin with its effective period information, and the information processor obtains effective period information via the input unit, and performs the retrieval process based on the input parent key information, the input child key information, the relating pin tables identified by the obtained identifiers and the obtained effective period information.

* * * * *